Figure 1:
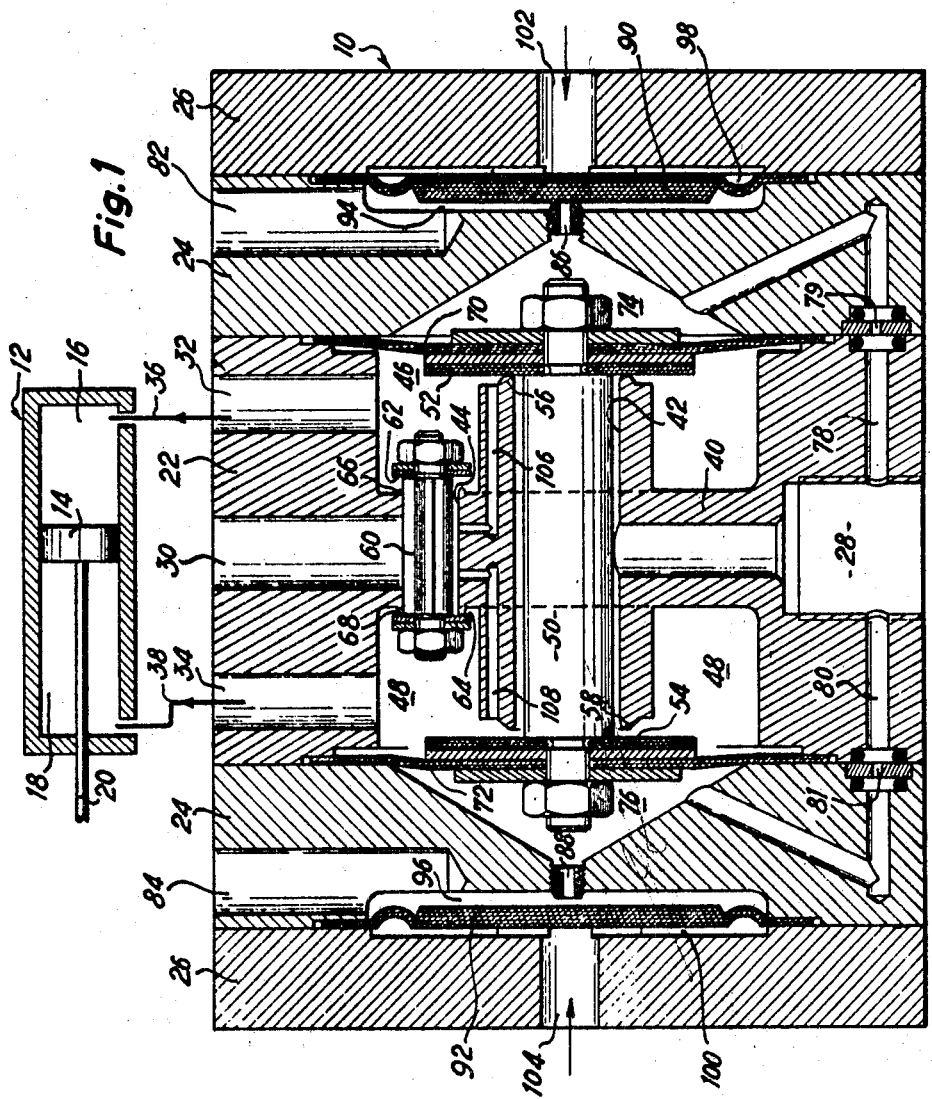

United States Patent

[11] 3,592,227

[72] Inventor Charles Rivolier
 11 rue d'Aulnoy, Cesson, 77, France
[21] Appl. No. 842,985
[22] Filed July 18, 1969
[45] Patented July 13, 1971

[54] FLUID PRESSURE CONTROL VALVE UNIT
 8 Claims, 2 Drawing Figs.
[52] U.S. Cl. ..................................... 137/596.14,
 137/625.66
[51] Int. Cl. ..................................... F16k 11/10
[50] Field of Search............................. 137/596,
 596.17, 625.66, 625.61, 625.62, 625.63, 625.65,
 625.5, 625, 106, 112, 119, 596.14, 596.15,
 596.16, 596.18

[56] References Cited
 UNITED STATES PATENTS
2,553,940 5/1951 Quartullo .................. 137/596.17 X
2,927,606 3/1960 Matchett, Jr. et al. ........ 137/119
2,984,218 5/1961 Christianson ................ 137/625.62 X Primary Examiner—M. Cary Nelson
Assistant Examiner—Robert J. Miller
Attorneys—C. F. Arens and Plante, Hartz, Smith & Thompson ABSTRACT: A control valve for switching high-pressure fluid from a first outlet to a second outlet, to position a piston in response to a pressure signal. The pressure signal moves a diaphragm to permit the high pressure to be selectively admitted to opposed inner chambers. A movable wall separates each inner chamber. The movable walls are connected by a shaft retained in a bore connected to the high-pressure fluid. Low pressure from the atmosphere controlled by an exhaust valve is communicated to the second outlet simultaneously with high pressure being communicated to the first outlet. Upon the outlet pressure being received by the inner chambers a pressure differential is created across the movable walls causing a valve to seat on the bore from the high pressure permitting high pressure to the other inner chamber. Once the shift has occurred, the pressure differential between the inner chamber will retain the movable walls in that operative position until a subsequent pressure signal is received.

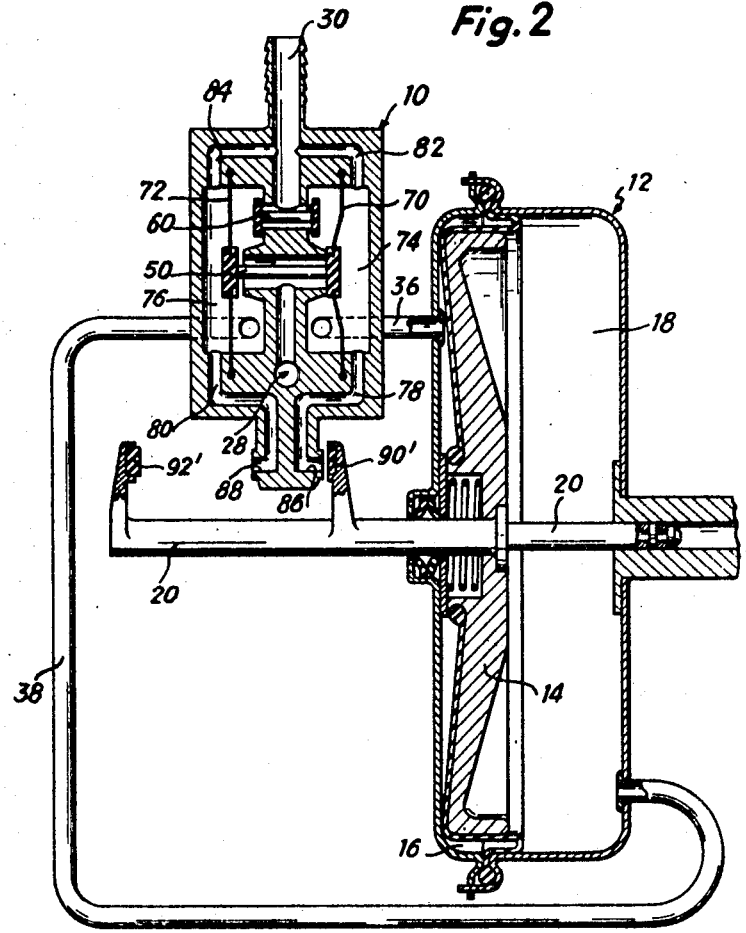

FLUID PRESSURE CONTROL VALVE UNIT

This invention relates to a fluid pressure control valve unit adapted to be located between two different fluid pressure sources for controlling an output differential pressure adapted to control actuation of pressure-actuated receiver means in response to a predetermined input signal.

It has been already proposed that fluid pressure control valve units of a type comprising in a casing, a control valve means operatively located between an inlet orifice adapted to be connected to a fluid pressure source and a return orifice adapted to be connected to a relatively low fluid pressure reservoir and operative, in response to a predetermined input control signal, to selectively connect two separate outlet orifices adapted to be operatively connected to output fluid pressure receiver means with said inlet and said return orifices respectively.

The main feature of the invention is to provide a fluid pressure control valve unit of the type set forth hereinabove characterized in that said control valve means is operatively connected and actuated by a differential pressure responsive movable assembly having a first effective area subjected to the output differential pressure between said separate outlet orifices so as to be moved by this latter pressure to one or the other of two opposed fully open positions depending on the sense of said input control signal-controlling initial actuation of said control valve means and movable assembly.

With such a feature it will be understood that the control valve means may be considered as a two-positions control valve which is maintained in one or the other of its fully open positions, as initially controlled by the sense of said input control signal, until the latter reaches an opposed predetermined value high enough to be capable of triggering said control valve means against the pressure force generated on said first effective area by the output differential pressure. In particular, it is to be noted that the said control valve means remains in one of its fully open positions even though the input control signal, which had initially controlled the triggering of said control valve means toward the above one position decreases to a value lower than its initial control value and even becomes nil.

Another object of this invention is to provide a fluid pressure actuated reciprocating motor characterized by comprising a fluid pressure control valve as set forth hereinabove for controlling actuation of the motor output member responsive to the pressure differential between the two opposed fluid motor pressure chambers connected to the outlet orifices of said control valve unit respectively, valve control means operatively connected to said output member being provided to control the actuation of said control valve means in accordance with the output member displacement.

With such a feature it will be understood that, in normal fluid pressure supply conditions, the reciprocating motor automatically and continuously operates until an output force balances the differential pressure force acting on the motor output member and thereby opposes any further actuating displacement of this latter.

Other features and advantages of the invention will appear from the following description taken in connection with the accompanying drawings in which:

FIG. 1 is a cross sectional view of a control valve unit in accordance with the invention and FIG. 2 is a cross-sectional diagrammatic view of a reciprocating pump motor according to the invention including a control valve unit similar to the one shown in FIG. 1.

Referring to FIG. 1, reference numeral 10 designates a control valve unit adapted, in the shown embodiment, to control actuation of a double-acting pressure-actuated motor 12 the movable pressure responsive element 14 of which is subjected to the differential pressure between pressure chambers 16 and 18 of the motor to actuate an output push rod 20.

The casing of valve unit 10 is substantially comprised of a central partition element 22 with a ring element 24 and a cup element 26 sealingly secured on each of the opposite faces of central element 22. This latter element is provided with an inlet supply port 28 adapted to be connected to a high fluid pressure source (not shown), an exhaust or return port 30 adapted to be connected to a relatively low fluid pressure reservoir, such as the atmosphere in the embodiment shown in FIG. 1, and, two output orifices 32 and 34 connected by fluid conduits 36 and 38 to motor pressure chambers 16 and 18 respectively. The central portion 40 of partition element 22 is provided with two substantially parallely extending bores 42 and 44 operatively connected by radial passages to supply and exhaust ports 28 and 30 respectively. Each of bores 42 and 44 opens into two separate output chambers 46 and 48 connected to output orifices 32 and 34 respectively.

Within bore 42 is slidably mounted a rod 50 having a length substantially larger than the axial length of the bore 42. Two check valve members 52 and 54 are operatively secured to the opposite ends of rod 50 and are adapted to sealingly cooperate with the opposite annular valve seat forming edges 56 and 58 of bore 42 respectively so as to control fluid communication from supply port 28 to one or the other of the output chambers 46 and 48 through the fluid passages provided between rod 50 and the sidewall of bore 42. In the same way, a rod 60 is slidably mounted within bore 44 so as to provide a fluid passage from any of the output chambers 46 and 48 to the exhaust port 30. The rod 60, the length of which is substantially larger than the axial length of bore 44, is provided at its opposite ends with two check valve members 62 and 64 adapted to sealingly cooperate with the opposite annular valve seat forming edges 66 and 68 respectively of bore 44.

Output chambers 46 and 48 are closed by two movable pressure responsive elements such as elastomeric diaphragms 70 and 72 respectively sealingly compressed at their respective outer annular portion between element 22 and ring elements 24 so as to define therewith two control fluid chambers 74 and 76. The movable pressure responsive elements 70 and 72 are further operatively secured to check valve members 52 and 54 respectively so as to define a moveable pressure responsive assembly responsive on the one hand to the output fluid pressure differential between output chambers 46 and 48 and on the other hand to the control fluid pressure differential between control chambers 74 and 76.

Control chambers 74 and 76 are connected on the one hand to supply port 28 by the fluid passages 78 and 80 respectively including restricted area orifices 79 and 81 respectively and on the other hand to exhaust ports 82 and 84, connected to the relatively low fluid pressure reservoir such as the atmosphere, through restricted area orifices 86 and 88 respectively. The check valve-forming central portions of two movable pressure responsive movable walls, such as diaphragms 90 and 92 sealingly compressed at their respective outer annular portion between elements 24 and 26, are adapted to sealingly cooperate with the valve seat-forming edges of orifices 86 and 88 respectively so as to control the fluid pressures in chambers 74 and 76 as easily understood by any one skilled in the art. Each movable wall 90 and 92 divides the space between ring and cup elements 24 and 26 into an exhaust chamber 94 or 96 connected to exhaust ports 82 or 84 respectively and into an input chamber 98 and 100 connected to an input control orifice 102 or 104 respectively provided in cup element 26.

For reasons which will appear hereinafter, limited fluid flow passages 106 and 108 are provided in central portion 40 to connect output chambers 46 and 48 respectively to exhaust port 30. Furthermore the effective fluid flow area of the supply passage defined between bore 42, rod 50 and check valve member 52 and 54 will be chosen substantially larger than the effective fluid flow area of the exhaust passage defined between bore 44, rod 60 and check valve member 62 or 64.

The valve control unit described hereinabove operates as follows: It will be assumed for instance that the two input control orifices 102 and 104 are operatively connected to a pressure control device (not shown) such as a so called "jet-on - jet valve" device, adapted to supply the two inlet control orifices 102 and 104 with a relatively low differential pressure signal. For instance, this differential pressure signal may be comprised of two complementary digital signals i.e. of two separate pressure signals one of which (input 1) corresponds to a predetermined fluid pressure level higher than the one (such as the atmosphere) of the other pressure signal (input 0). It will be further assumed that the various valve elements are initially positioned as shown in FIG. 1 with the motor chamber 18 being connected to supply port 28 through bore 42, chamber 48, output orifice 34 and conduit 38 and the motor chamber 16 being connected to exhaust port 30 through bore 44, chamber 46 output orifice 32 and conduit 36. The movable supply valve assembly 50-70-72 is maintained in its shown position by the differential pressure between control chambers 74 and 76 acting on the effective area of diaphragms 70 and 72 as well as by the differential pressure between output chambers 48 and 46 acting on this latter diaphragm area minus the effective cross sectional area of valve seat 56 or 58. The movable exhaust valve assembly 60-62-64 is maintained in its shown position by the differential pressure between output chambers 48 and 46 acting on the effective area of check valve member 64.

Upon supplying inlet control orifice 104 with a pressure signal above the pressure in chamber 96 and simultaneously connecting control orifice 102 to a relatively low fluid pressure reservoir such as the atmosphere, diaphragms 90 and 92 are moved toward the right as seen in FIG. 1 to open orifice 86 and close orifice 88 respectively. The pressure in chamber 74 decreases to become substantially equal to the low pressure in chamber 94 due to the limited area of orifice 79 whereas the pressure in chamber 76 builds up to become substantially equal to the high pressure at supply port 28. The resulting control differential pressure signal between chambers 76 and 74 overcomes the output differential pressure force on diaphragms 72 and 70 and biases the movable supply valve assembly 50-70-72 toward the right as seen in FIG. 1 to terminate the communication between output chamber 48 and supply port 28 and to connect the latter to output chamber 46.

An escape of fluid through passages 44 and 106 does not prevent pressure to build up in chamber 46, because the fluid flow area of these passages is small compared to that of the bore 42. Meanwhile, pressure in chamber 48 decreases as the fluid in this chamber is vented through passage 108, until an unstable pressure equilibrium is reached. At this time the pressure force acting on the exhaust valve assembly 60, 62, 64 as a result of the pressure difference between the output chambers 46 and 48 is enhanced by a dynamic pressure force similar to a Bernouilli pressure force, due to the substantial fluid flow through the passages 44 and 106, and urging the valve assembly 60, 62, 64 toward the left (as seen in FIG. 1). Eventually, the valve assembly will shift to the left with a snap action, thus terminating the communication from chamber 46 to exhaust port 30. Thus, passages 106 and 108 prevent a hydraulic lock up upon shift of the movable walls 70 and 72 by allowing high pressure to escape to the atmosphere. To trigger the control valve unit toward its opposed fully open position to inverse the output displacement of the output push rod 20, it will be only necessary to open orifice 88 and to close orifice 86 by introducing an input pressure signal at orifice 102 and connecting 104 to the atmosphere.

As easily understood by anyone skilled in the art, the modifying of the effective fluid flow areas of orifices 79 and 81 permits to substantially adjust the time delay response of the valve control unit 10. Furthermore, due to the substantial difference between the effective areas of diaphragms 90 and 92 and the relatively small effective area of passages 86 and 88, the input control pressure signal at 102 or 104 can be provided with a very small pressure level with respect to the fluid pressure in chambers 94 and 96.

In the embodiment shown in FIG. 1 the two position valve assembly is controlled by a differential pressure as established in separate control chambers 74 and 76 by two complementarily acting input valves 86—90 and 88—92 respectively. However it will be understood that the orifices 86 and 88 could be operatively located to be suitably controlled by a single check valve element responsive to an input control signal and that the valve assembly 50-70-72 could be directly controlled by any input differential pressure signal supplying control chambers 74 and 76 or even mechanically controlled by an input force acting on rod 50.

The elements described above with reference to FIG. 1 are used to designate like elements in FIG. 2.

In the embodiment shown in FIG. 2, the valve unit 10 is adapted to control the double-acting piston 12 of a power-braking system. The high pressure supply port 28 is connected to atmosphere, while the low pressure supply port 30 is adapted to be connected to a vacuum source such as the intake manifold of an engine. The outlet conduits 36, 38 are connected to fluid chambers 16, 18, respectively, on one side and the other of the moving wall 14 of a double-acting piston member 12. The push rod 20, connected to the moving wall 14, is operative to actuate the piston of an oil pump only partly represented. The push rod 20 extends outside the casing of the double acting piston member 12 and supports a pair of spaced valve plugs 90', 92'. These plugs are located on either side of the valve control unit 10 and they are facing the valve seat forming edges of orifices 86 and 88, respectively. Their spacing is such that one plug engages one orifice at the end of each stroke of the push rod.

In the operation of the valve control unit, assuming that the various elements are positioned as shown in FIG. 2, the conduit 38 is connected to atmosphere while the conduit 36 is connected to the vacuum source. Pilot chambers 74 and 76 are connected to atmosphere through orifices 86 and 88, respectively. Hence, the control valve 50 is forced toward the left, and the push rod 20 is moving toward the left. Upon engagement of the gasket 90' with the orifice 86, vacuum will be installed in pilot chamber 74 through passage 82 and port 30. Due to the pressure difference between the pilot chambers 74 and 76, the control valve 50 will shift toward the right. Consequently, the conduit 36 will be connected to atmosphere, while the conduit 38 will be discharged to vacuum as previously described. It is to be noted that the control unit is piloted by the piston which is being controlled.

I claim:

1. Valve means movable in response to a pressure signal from a first position, where fluid is communicated from a first source to a first outlet and from a second source to a second outlet, to a second position, where fluid is communicated from said first source to said second outlet and said second source to said first outlet, said valve means comprising:
   a housing having first and second inner chambers;
   a first wall member dividing said first inner chamber into a first fluid flow chamber and a first control chamber, said first fluid flow chamber being connected to said first outlet;
   a second wall member dividing said second chamber into a second flow chamber and a second control chamber, said second flow chamber being connected to said second outlet, said first and second control chambers receiving said pressure signal, said first and second inner chambers having bleed passages to vent excess fluid upon movement;
   means secured to said first and second wall members for alternatively opening and closing communication between said first source of fluid and said first and second flow chambers in response to said signal creating a pressure differential across said first and second wall members; and
   control means responsive to the pressure differential between said first flow chamber and said second flow chamber for alternatively opening and closing communication between said second source of fluid and said second and first flow chamber, said pressure differential between said first and second flow chambers adapted to retain said first and second walls in a stationary position until a subsequent pressure signal is received.

2. A two-position fluid pressure valve mechanism movable in response to a pressure signal from a first position, where fluid communication is established between high and low fluid pressure sources and separate outlets, to a second position where the communications are reversed, said mechanism comprising:
   a housing having first and second adjacent inner chambers having opposite ends sealed by a pair of opposed pressure responsive movable walls, said walls being attached to a movable assembly for alternatively opening and closing a bore communication between said high fluid source and said first and second inner chambers, one of said separate outlets being connected to said first inner chamber and the other to said second inner chamber, said first and second chambers being connected to said low pressure source by bleed passages for preventing a fluid lock upon movement from said first position to said second position; and
   exhaust means responsive to the pressure differential between the first and second inner chambers for alternatively opening and closing communication between said first and second chambers and said low-pressure source for establishing low pressure in said second chamber while high pressure is communicated to said first chamber, said pressure differential between said first and second inner chambers adapted to act on the opposed inner surfaces of said movable walls for retaining said movable assembly in said first position until a pressure signal applied from the outside of said first and second inner chambers to said movable walls initiates movement to said second position.

3. The valve mechanism, as recited in claim 2, wherein said exhaust means includes:
   a shaft retained in a bore extending through a wall separating said first and second inner chambers, said bore communicating with said low pressure source, said shaft having face members on each end for seating on said wall in response to the pressure differential between said first and second inner chambers.

4. The valve mechanism, as recited in claim 3, wherein each of said movable walls have equal surface areas for reacting to the same intensity in moving from said first position to said second position.

5. The valve mechanism, as recited in claim 1, including:
   a first pilot chamber in communication with said first inner chamber; and
   a second pilot chamber in communication with said second inner chamber, said first and second pilot chambers being connected to said high pressure source through a passage in said housing and to separate low pressure sources through separate passages, said pressure signal for operating said valve mechanism being obtained by selectively closing communications between one of said separate low pressure sources and said first and second control chambers.

6. The valve mechanism, as recited in claim 5, wherein said high-pressure passage includes:
   a restriction and each of said low pressure passages contains a check valve, said check valves being selectively opened and closed for preventing low pressure communication to said first and second pilot chambers while permitting high pressure to said first and second pilot chambers through said restriction causing a pressure differential across said movable walls for moving said movable assembly.

7. The valve mechanism, as recited in claim 6, wherein the effective fluid flow area of the fore of said exhaust means is substantially smaller than that of the bore communicating high pressure to the first and second inner chambers.

8. The valve mechanism, as recited in claim 7, wherein the effective flow area of said bleed passages is small as compared to the bores of said exhaust means and said high pressure.